US007253729B2

(12) United States Patent
Lastinger et al.

(10) Patent No.: US 7,253,729 B2
(45) Date of Patent: Aug. 7, 2007

(54) WIRELESS VENDING COMMUNICATION SYSTEMS

(75) Inventors: Roc A. Lastinger, Cave Creek, AZ (US); Chuck Glasser, Scottsdale, AZ (US); Nissim Ozer, Las Vegas, NV (US); Robert Ufford, Roswell, GA (US); Armando Viteri, Scottsdale, AZ (US)

(73) Assignee: RF Code, Inc., Mesa, AZ (US)

( * ) Notice: Subject to any disclaimer, the term of this patent is extended or adjusted under 35 U.S.C. 154(b) by 123 days.

(21) Appl. No.: 10/616,704

(22) Filed: Jul. 9, 2003

(65) Prior Publication Data

US 2004/0142685 A1 Jul. 22, 2004

Related U.S. Application Data

(60) Provisional application No. 60/394,757, filed on Jul. 9, 2002.

(51) Int. Cl.
*G08B 1/08* (2006.01)
*H04Q 7/00* (2006.01)

(52) U.S. Cl. .................... 340/539.1; 700/236; 700/244

(58) Field of Classification Search ............ 340/539.1; 379/39, 40, 90.01; 700/236, 241, 244
See application file for complete search history.

(56) References Cited

U.S. PATENT DOCUMENTS 5,844,808 A 12/1998 Konsmo et al.
6,339,731 B1 * 1/2002 Morris et al. ............... 700/236
6,356,794 B1 3/2002 Perin, Jr. et al.
6,377,589 B1 * 4/2002 Knight et al. ............... 370/524
6,430,268 B1 * 8/2002 Petite .......................... 379/39
6,462,644 B1 * 10/2002 Howell et al. ............. 340/5.92
6,505,095 B1 * 1/2003 Kolls ......................... 700/244
6,575,363 B1 * 6/2003 Leason et al. .............. 235/381
6,754,558 B2 * 6/2004 Preston et al. .............. 700/236
6,844,813 B2 * 1/2005 Hardman ................. 340/539.1

FOREIGN PATENT DOCUMENTS

EP 1182525 A2 2/2002
EP 1199680 A2 4/2002

* cited by examiner

*Primary Examiner*—John Tweel, Jr.

(57) ABSTRACT

A system includes a plurality of vending machines communicating wirelessly with a centralized consolidation unit. The consolidation unit communicates via a pre-established communications network, such as a wired or wireless telephone network with a data collection center. A method of polling a vending machine having a wireless transceiver includes sending a first wireless signal to the wireless transceiver of the vending machine, the first signal soliciting a status response from the vending machine, and receiving a second wireless signal from the transceiver of the vending machine, the second signal including the status response which includes information pertaining to a status of the vending machine. The status information may pertain to an inventory level, money deposits, maintenance status or security status of the vending machine.

5 Claims, 5 Drawing Sheets

WIRELESS VENDING COMMUNICATION SYSTEMS

CROSS-REFERENCE TO RELATED APPLICATIONS

This application claims benefit of priority under 35 U.S.C. § 119(e) from U.S. application Ser. No. 60/394,757, filed by the same inventors on Jul. 9, 2002.

BACKGROUND OF THE INVENTION

1. Technical Field

The invention generally relates to wireless vending solutions. More specifically, the invention relates to wireless communications systems and methods for vending system inventory, control, and maintenance.

2. Background Art

Many electronic vending machines contain a variety of electronic control units with, for example, automated data collection, sensor, and security systems. Conventionally, some of these vending machines are attached to fixed-line and cellular phone communications networks. The vending machines use the embedded fixed line/cellular phones to periodically call a central reporting center to report inventory and machine status.

A major disadvantage to this type of conventional system is the monthly cost associated with the both the fixed-line and/or cellular telephone connections. Further the technology and circuits utilized in both wired and wireless telephone communication systems add to the expense of each vending machine. As used herein, a "vending machine" is any device that functions to dispense an item to a person. An "item" may be anything dispensed from a vending machine such as candy, soda, newspapers, phone cards, money (ATM), tokens, and other goods.

The present invention discloses alternative systems and methods that can be used to provide automated reporting for vending machines.

BRIEF SUMMARY OF THE INVENTION

According to one aspect of the present invention a polling system for vending machines includes at least one vending machine having an electronic control unit which tracks information pertinent to the vending machine, and a wireless transceiver in communication with the electronic control unit and operative to send the pertinent information wirelessly to an interrogation unit when requested by the interrogation unit.

In another aspect of the invention, a vending machine system includes at least two vending machines each having a respective wireless transceiver operative to transmit respective status information about its associated vending machine. The system also includes a consolidation unit configured to receive the wirelessly transmitted status information and interfaced with an established communications network such as a wired or wireless telephone network.

Further advantages of the present invention are derived from a vending network including a plurality of vending machines each including a wireless transceiver operative to transmit vending machine information to and from other nearby vending machines thus forming a wireless relay network. Further, a relay unit or consolidation unit may forward information from the wireless relay network to a data collection center over an existing communication network. Additional features of the present invention relate to a method of polling a vending machine having a wireless transceiver. The method includes sending a first wireless signal to the wireless transceiver of the vending machine, the first signal soliciting a status response from the vending machine, and receiving a second wireless signal from the transceiver of the vending machine, the second signal including the status response which includes information pertaining to a status of the vending machine.

BRIEF DESCRIPTION OF THE DRAWING

Further aspects, features and advantages of the present invention will become apparent from the following description of the invention in reference to the appended drawing in which like numerals denote like elements and in which.

DETAILED DESCRIPTION OF THE INVENTION

Curbside Poling

Figure 1:
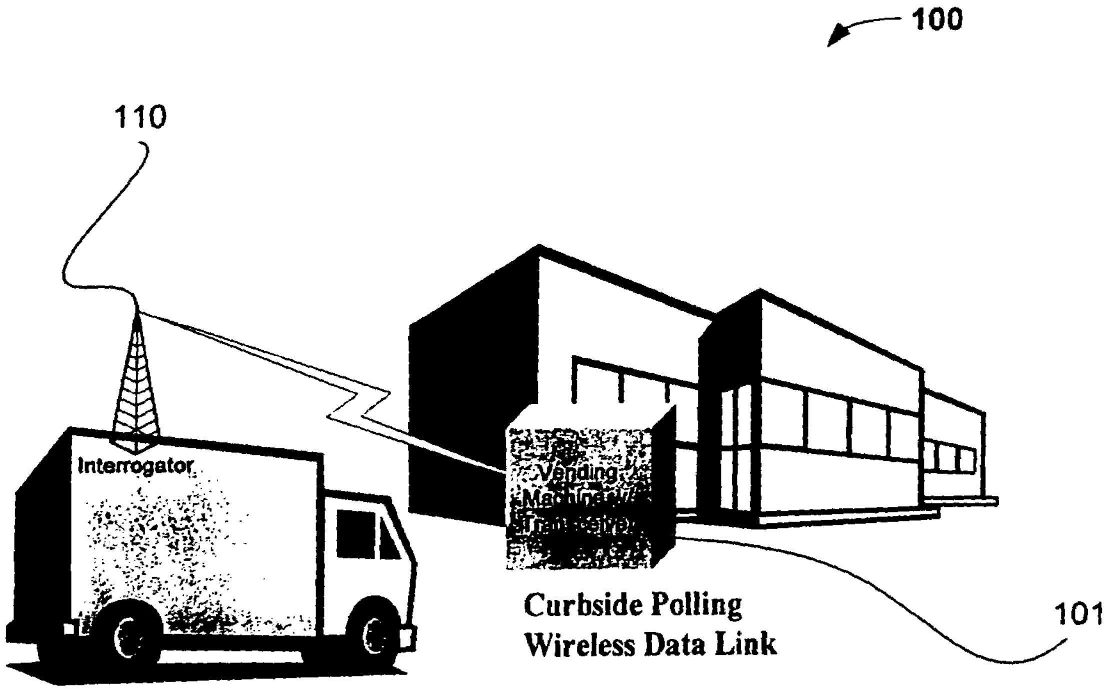
FIG. 1 is a functional block diagram of a vending system according to a first embodiment of the invention.

Referring to FIG. 1, a vending system 100 with wireless communication capabilities according to a first embodiment of the invention includes a transceiver (not separately shown) that is connected to the existing electronic control unit of a vending machine 101. The transceiver may transmit and/or receive on any wavelength of wireless communications. In the preferred embodiment, the transceiver communicates in the radio frequency (RF) or infrared frequency (IF) range.

An interrogation unit 110, using compatible communication frequencies, e.g., RF, is used to query the status of the vending machine. For example, the interrogation unit may be installed in a delivery vehicle that interrogates the vending machine directly from the parking lot or loading ramp where the delivery vehicle is parked. This configuration provides a series of advantages over the methods currently in use. For example, delivery personnel can accurately access the inventory level, money deposits, and other desired information of each vending machine located within the range of the vehicle. Thus allowing the delivery personnel to know the status of the vending machine 101 before leaving the vehicle, for example, to load the appropriate inventory prior to leaving the truck. System 100 could be used to eliminate multiple trips to and from the delivery vehicle, or to know whether to spend time servicing the vending machine 101 in the first place.

In one preferred embodiment of the invention, the transceiver and interrogator used in system 100 are of the type used for RF monitoring devices and systems used for inventory control in for example warehousing. The most preferred systems include radio frequency or infrared system components available from RF Code, Inc. located at 1250 S. Clearview Ave. Suite 104, in Mesa Ariz.

In dense metropolitan areas, the Curbside Poling system can be used by supervisory vehicles to automatically poll the status of vending machines while driving through selected areas. Inventory, monetary, and maintenance statuses can then be relayed to a dispatch center that can load the next delivery vehicle with the appropriate inventory for the selected area. In one preferred configuration, the RF frequency and power level of transceiver units in the vending machine 101 and interrogator 110 will support bidirectional read ranges of 300–500 feet or approximately 91–153 meters.

Maintenance and Monitoring

In a modified embodiment, the transceiver of the Curbside Polling system 100 is in communication with to the vending machine's built-in-self-test system, temperature monitoring circuit, security system, and/or other embedded sensors. In this configuration, system 100 can be used to determine the status of each vending machine prior to approaching vending machine 101, for example, before maintenance personnel leaves their maintenance vehicle. In this manner, the correct type of tools and/or equipment that may be needed for servicing the unit may be brought to the unit 101 the first time, i.e., without going back to the maintenance vehicle.

Telephone—Central Polling System

As discussed above, certain conventional vending machines/systems use fixed-line and cellular telephone systems as a means of reporting inventory status. The primary disadvantage to the telephone systems is the monthly cost of phone line or access for each machine and cost of hardware technology. In this embodiment of the invention, the RF transceiver unit described previously is used to provide a link to a Consolidation Unit that is centrally located to multiple vending machines.

Figure 2:
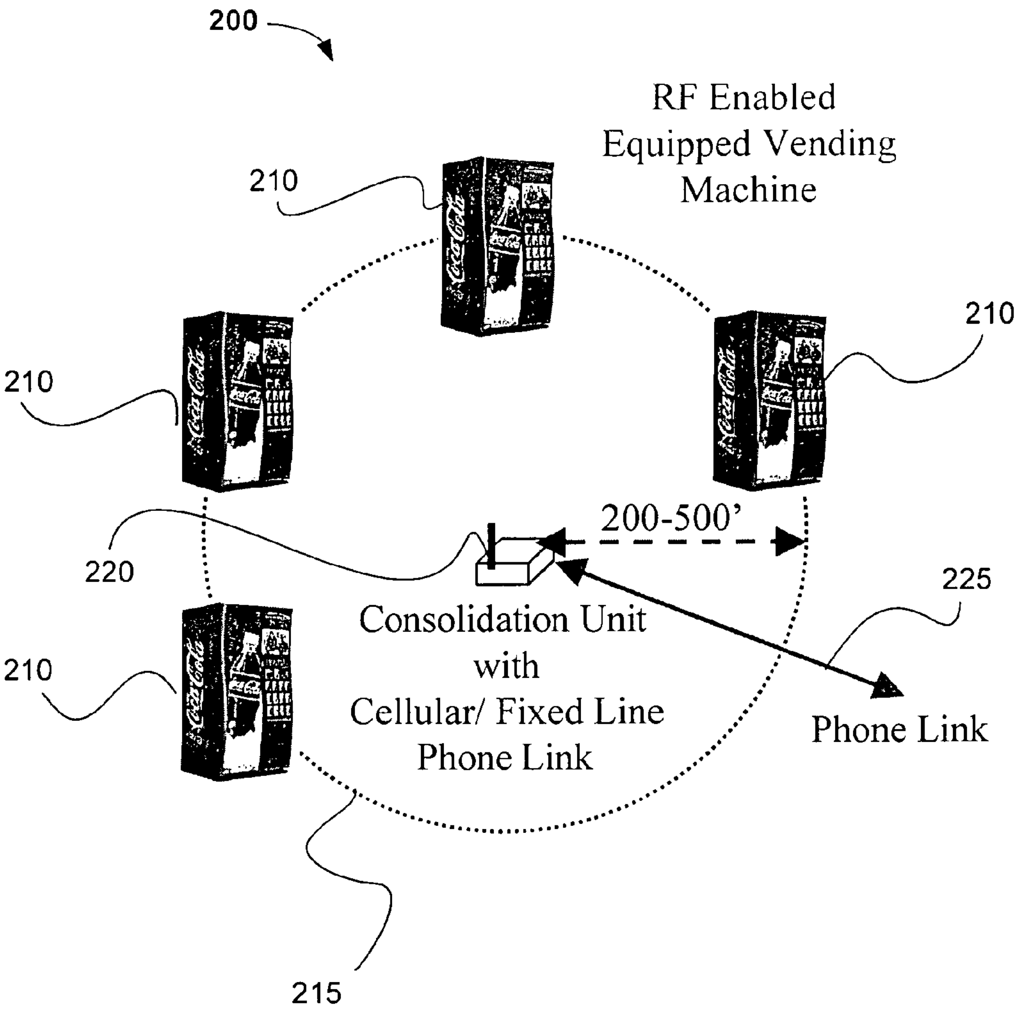
FIG. 2 is a functional block diagram of a vending system according to another preferred embodiment of the invention.

Referring to FIG. 2, system 200 includes a plurality of vending machines 210 communicating via a wireless network 215 with a centralized consolidation unit 220. Consolidation unit 220 is preferably the only component of system 200 that communicates via a pre-established communications network 225, such as a wired or wireless telephone network, a switched packet network or other type of communication network.

Consolidation unit 220 may automatically poll or otherwise collect data from vending machines 210 using, for example, an RF data link 215. Consolidation unit 220 then report such information to a Central Data Collection Center (not shown) via the pre-established communications network 225. In this embodiment, the monthly cost associated with the telephone system is shared by multiple vending machines. This embodiment has significant advantages, particularly in dense metropolitan areas where a single phone line connection can be used to support a network of vending machines located in several buildings or businesses.

Long Range RF—Central Polling System

Figure 3:
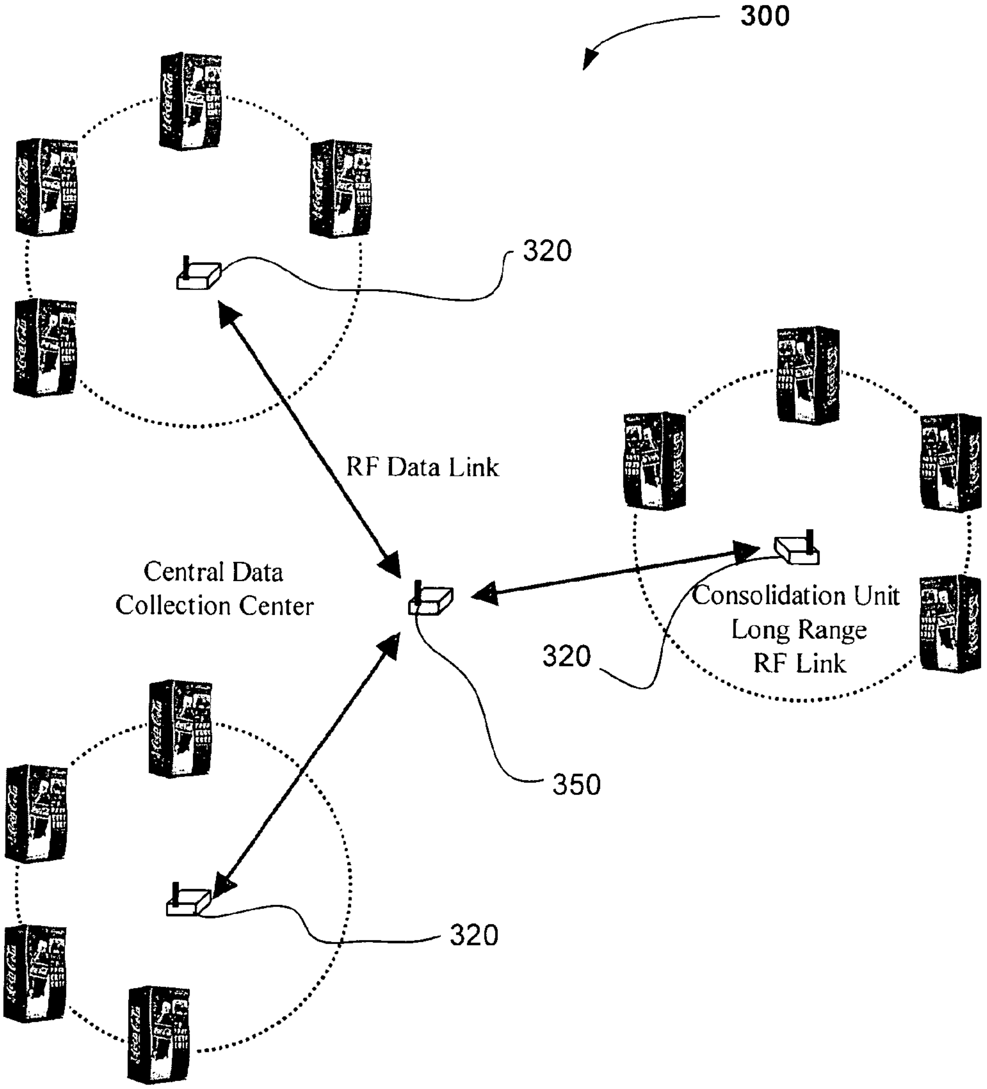
FIG. 3 is a functional block diagram of a vending system according to yet another embodiment of the present invention.

Referring to FIG. 3, system 300 is configured in a manner similar to that of the previous embodiment; however, each consolidation unit 320 communicates with a central collection center 350 using long-range wireless broadcast systems. In the preferred implementation of this embodiment, the frequency and power level of the long-range system will support bidirectional communication between the consolidation units 320 and the central data collection center 350. The use of, for example, an RF link significantly reduces the monthly cost associated with conventional vending communications using cellular networks. In a modified implementation of this embodiment, unit 350 may serve as a relay that connects multiple vending networks in a communications link to a further data destination (not shown). By networking the individual vending system networks together and relaying information using unit 350 (which may be a mobile unit or fixed relay unit), inexpensive low power transmitting units may be utilized in vending machines without any need for dedicated phone lines or cellular networks or related equipment.

In metropolitan areas that are spread over large geographic areas, multiple Data Collection Centers can be established to provide extended coverage for large areas. The Central Data Collection Centers can be tied to a Regional Consolidation Centers via traditional fixed telephone service or other conventional communication systems, for example, using satellite, Internet and/or broadband communications networks.

Due to the limited data rates associated with each vending machine, the computer and communications requirements for consolidation units 320, and Central Data Collection Centers 350 and/or Regional Consolidation Centers, are relatively modest and can be supported with low-end computer systems with standard communications equipment.

Data Relay Network

Figure 4:
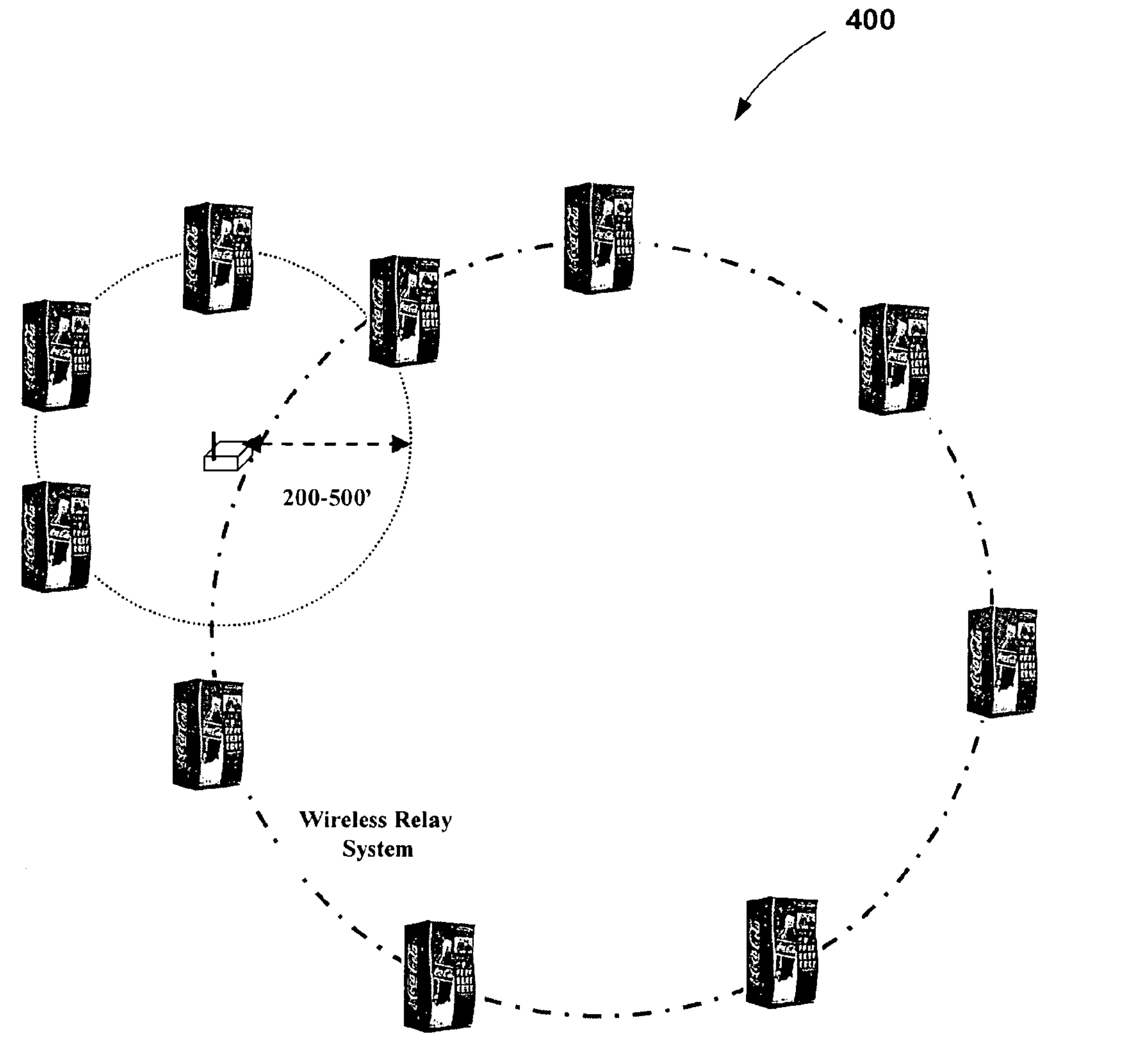
FIG. 4 is a functional block diagram of a vending system according to yet another embodiment of the present invention.

Turning to FIG. 4, according to yet another embodiment of the invention system 400 includes each vending machine setup in a wireless network to relay information from vending machine-to-vending machine. Since the data rates associated with each vending machine is relatively low, the systems already described can be easily modified to provide this relay capability. In this manner, the range of the data collection network for a single consolidation unit can be greatly expanded with only a modest increase in system cost/complexity.

Handheld Data Collection Unit

Figure 5:
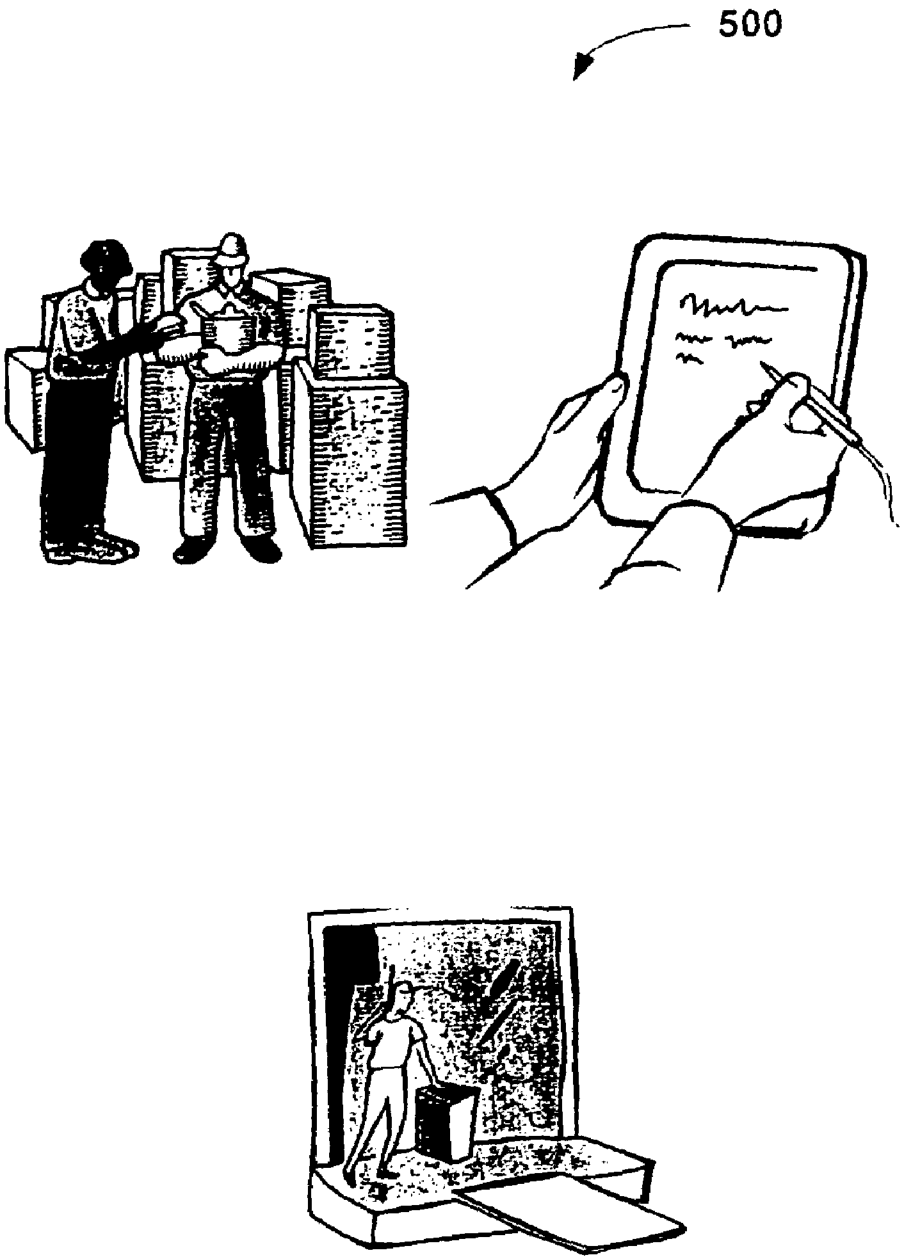
FIG. 5 is a functional block diagram of a hand held interrogator and vending system of one embodiment of the invention.

Turning to FIG. 5, a further embodiment of the invention will now be described. In this embodiment, system 500 includes a portable handheld interrogation unit that may interface to the systems in any of the previously described embodiments.

The Handheld Interrogator can be used independently, or in conjunction with the interrogation unit mounted in delivery vehicles to automatically collect vending machine inventory and maintenance information. In addition, if the vending machine is equipped with an electronic lock/security system the Hand Held Interrogator can be used to automatically lock/unlock the vending machine.

The Handheld Interrogator can also be programmed to interface via an RF link to local Consolidation units. This will provide delivery and service personnel with a direct data link to a dispatch and management centers attached to the data communication network.

Unless contrary to physical possibility, the inventor envisions the methods and systems described herein: (i) may be performed in any sequence and/or combination; and (ii) the components of respective embodiments combined in any manner.

Although there have been described preferred embodiments of this novel invention, many variations and modifications are possible and the embodiments described herein are not limited by the specific disclosure above, but rather should be limited only by the scope of the appended claims.

The invention claimed is:

1. A vending network comprising:

a plurality of vending machines each including a wireless transceiver operative to transmit vending machine information to and from other vending machines forming a wireless relay network, one of the vending machines in the wireless relay network for receiving vending machine information from one or more of the other vending machines in the wireless relay network having vending machine information to report and reporting the received vending machine information.

2. The network of claim 1 further comprising a consolidation unit positioned within range of the wireless relay network of vending machines, the consolidation unit configured to receive from the reporting vending machine vending machine information for each of the vending machines in the wireless relay network having vending information to report, said consolidation unit also having an interface with an established communications network.

3. The network of claim 1 wherein the reporting of the received vending machine information is automatically performed at one or more predetermined times.

4. The network of claim 1 wherein the reporting of the received vending machine information is performed when the reporting vending machine is prompted to report by a received signal.

5. The network of claim 1 wherein the reporting vending machine reports vending machine information for each of the vending machines in the wireless relay network having vending information to report.

* * * * *